Feb. 25, 1947.  D. S. GREY  2,416,443

OPTICAL SYSTEM

Filed April 23, 1943

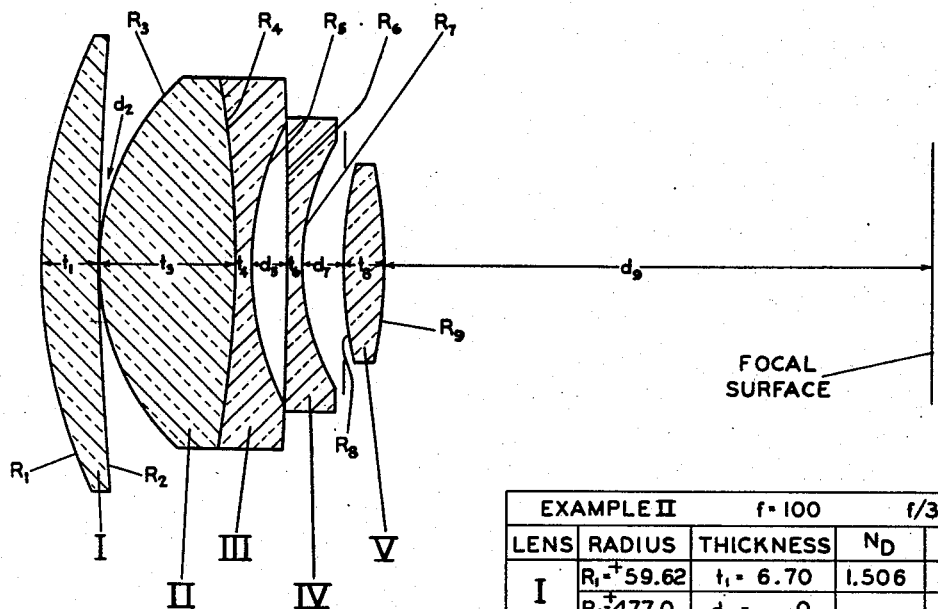

| EXAMPLE I | f=100 | | f/3 | |
|---|---|---|---|---|
| LENS | RADIUS | THICKNESS | $N_D$ | V |
| I | $R_1=+43.36$ | $t_1=7.45$ | 1.506 | 57 |
| | $R_2=+815.0$ | $d_2=0$ | | |
| II | $R_3=+33.16$ | $t_3=13.57$ | 1.506 | 57 |
| | $R_4=-125.5$ | | | |
| III | $R_4=-125.5$ | $t_4=1.69$ | 1.591 | 31 |
| | $R_5=+39.76$ | $d_5=3.75$ | | |
| IV | $R_6=-183.4$ | $t_6=1.69$ | 1.591 | 31 |
| | $R_7=+28.41$ | $d_7=6.50$ | | |
| V | $R_8=+74.52$ | $t_8=6.40$ | 1.591 | 31 |
| | $R_9=-67.57$ | $d_9=59.61$ | | |

| EXAMPLE II | f=100 | | f/3 | |
|---|---|---|---|---|
| LENS | RADIUS | THICKNESS | $N_D$ | V |
| I | $R_1=+59.62$ | $t_1=6.70$ | 1.506 | 57 |
| | $R_2=+477.0$ | $d_2=0$ | | |
| II | $R_3=+28.74$ | $t_3=15.5$ | 1.506 | 57 |
| | $R_4=-119.2$ | | | |
| III | $R_4=-119.2$ | $t_4=1.60$ | 1.591 | 31 |
| | $R_5=+36.11$ | $d_5=4.00$ | | |
| IV | $R_6=-265.0$ | $t_6=1.60$ | 1.591 | 31 |
| | $R_7=+27.11$ | $d_7=4.80$ | | |
| V | $R_8=+50.73$ | $t_8=4.80$ | 1.591 | 31 |
| | $R_9=-73.94$ | $d_9=61.9$ | | |

| EXAMPLE III | f=100 | | f/3 | |
|---|---|---|---|---|
| LENS | RADIUS | THICKNESS | $N_D$ | V |
| I | $R_1=+82.45$ | $t_1=6.69$ | 1.506 | 57 |
| | $R_2=+308.5$ | $d_2=0$ | | |
| II | $R_3=+26.71$ | $t_3=13.5$ | 1.506 | 57 |
| | $R_4=-119.5$ | | | |
| III | $R_4=-119.5$ | $t_4=1.53$ | 1.591 | 31 |
| | $R_5=+36.50$ | $d_5=3.85$ | | |
| IV | $R_6=-156.8$ | $t_6=1.63$ | 1.591 | 31 |
| | $R_7=+28.21$ | $d_7=5.93$ | | |
| V | $R_8=+63.76$ | $t_8=6.89$ | 1.591 | 31 |
| | $R_9=-64.61$ | $d_9=64.2$ | | |

INVENTOR.
David S. Grey
BY Donald L. Brown
Attorney

Patented Feb. 25, 1947

2,416,443

UNITED STATES PATENT OFFICE 2,416,443

OPTICAL SYSTEM

David S. Grey, Cambridge, Mass., assignor to Polaroid Corporation, Cambridge, Mass., a corporation of Delaware Application April 23, 1943, Serial No. 484,209

9 Claims. (Cl. 88—57)

This invention relates to lens systems, and more particularly to photographic objectives.

It is one object of the present invention to provide a novel photographic objective formed from lens components having indices of refraction and dispersive indices, i. e., nu values, available in organic resins.

Another object is to provide a novel photographic objective of the above type having a focal ratio as low as F/3 and a flat, anastigmatic field.

A further object is to provide a novel photographic objective of the above type wherein the "Petzval sum" is sufficiently satisfied without excessive curvature of the lens elements.

Still another object is to provide a novel photographic objective system having an over-all length, i. e., from the first lens vertex to the focal plane, which is not appreciably greater than the focal length of the system.

These and other objects and novel features of this invention will more fully appear from the following detailed description when the same is read in connection with the accompanying drawing. It is to be expressly understood, however, that the drawing is for the purpose of illustration only and is not intended as a definition of the limits of the invention, reference being primarily had for this latter purpose to the appended claims.

There is illustrated in the drawing a diagrammatic view of one form of lens system embodying the present invention and constructional data for three examples of said system.

According to the invention there is provided a photographic objective comprising a partially achromatized positive lens, preferably of several components, followed in order by a strong negative flint lens and a positive lens of low nu value, i. e., of flint material, each of said last two lenses consisting, in the preferred embodiments, of a single component. This arrangement of lenses satisfies the "Petzval sum" without excessive lens curvatures and has an over-all length which, in the preferred embodiments of the system, is substantially equal to the focal length of the system. To obtain a flat, anastigmatic field it has been the practice to use crown and flint materials for the lenses such that the crown index of refraction is not appreciably lower than the flint index. However, in the present invention, a flat, anastigmatic field is obtained with lens materials of organic resins or plastics wherein the crown index of refraction is appreciably lower than the flint index, as for example, wherein the flint index of refraction is .08 greater than the crown index of refraction, and wherein the difference in dispersive indices, i. e., the nu values $$\left(\frac{N_D-1}{N_F-N_C}\right)$$

of the materials exceeds 20. It will, however, be apparent to those skilled in the art, from the following description, that the novel features of the present invention may be embodied in lens systems of, for example, flint and crown glasses having different ratios of index of refraction to nu value than those specified.

All of the succeeding data concerning the powers of the several lenses are based on a power for the entire lens system of unity.

In the form illustrated, the foremost partially achromatized positive lens of the novel photographic objective comprises three components, I, II, and III, which are preferably in contact. The foremost lens I is a positive crown lens and is followed by a second positive crown lens II, the latter having lens III, which is a negative flint lens, cemented thereto to form a doublet therewith. The power of lens I is from .66 to 1.33 and is preferably approximately one. The power of lens II is approximately 1.5 to 2.5 and preferably 2, while the negative lens III has a power of 1.5 to 2.5 and preferably 2. The powers of the lens elements I, II and III are selected within the specified ranges so that the power of the partially achromatized lens consisting of said elements is equal to from 0.5 to 1.5 and is preferably about 1. The rear surface $R_2$ of lens I is preferably plano or slightly curved from plano in either direction, the radius of curvature being not less than 2.5. The central radius $R_4$ of doublet II, III is from .90 to 1.60, and preferably approximately 1.25.

The strong, negative flint lens which follows the above partially achromatized positive lens preferably consists of a single component IV which has a power of from 2 to 3, preferably 2.5. The forward surface $R_6$ of lens IV may be plano or concave with the radius of curvature equal to not less than one.

The positive lens of low nu value which constitutes the rear element of the photographic objective preferably consists of a single component V of flint material. Lens V has a power of from 1.4 to 2.1, preferably 1¾ and is bi-convex with the radius of either surface thereof as much as twice the radius of the other.

The separation of lenses III and IV and the thickness of lenses I, II, III, and IV is preferably as little as possible when, in the preferred embodiments, a maximum aperture of F/3 is to be obtained. If the system is to have a smaller aperture, as for example, of F/4, thickness $t_3$ of lens II may be decreased, in which event the separation $d_5$ of lenses III and IV may be increased by approximately ⅓ of the decrease in the thickness of $t_3$.

The air space $d_7$ between lenses IV and V is selected to correct for lateral color and in the preferred embodiments of the invention varies from .048 to .065 times the focal length of the system. The thickness $t_8$ of lens V is not critical and is preferably equal to approximately the separation $d_7$ of lenses IV and V. For best results, the diaphragm should be positioned between lenses IV and V.

Each of the lens elements I, II, III, IV and V is preferably formed from an organic resin and a satisfactory resin for the crown material is cyclohexyl methacrylate, which has an index of refraction ($N_D$) of approximately 1.506 and a dispersive index or nu value (V) of approximately 57. For the flint material it is preferable to employ styrene, which has an index of refraction ($N_D$) of approximately 1.591 and a nu value (V) of approximately 31. While said materials are preferred other resins or optical glasses having the desired difference in dispersive indices and in indices of refraction may be employed in accordance with the invention as will now be apparent to those skilled in the art.

The tables below relate to the several examples of the lens system illustrated in the drawing and are to be interpreted as illustrative only and not in a limiting sense.

The column "radius" of the tables refers to the radii of the spherical surfaces as measured in the same linear units as those used to measure the focal length of the system illustrated, which in all of the following examples is equal to 100 linear units, as for example, millimeters. The column designated "thickness" refers to the thickness of the lenses, also the air gaps between lenses, as measured on the axis of the lens system, in the same linear units as those used to measure the "radius." The letter "$t$" indicates lens thickness and the letter "$d$" air spaces, $d_9$ being the air space between $R_9$ and the focal surface. The term "$N_D$" is used to designate the index of refraction of the materials for the lenses as measured for the yellow "D" line of a sodium arc. The column "V" designates nu value, $$\left(\frac{N_D - 1}{N_F - N_C}\right)$$

i. e., reciprocal dispersion, for the lens materials used.

Example I
f=100    f/3

| Lens | Radius | Thickness | $N_D$ | V |
|---|---|---|---|---|
| I | $R_1=+43.36$<br>$R_2=+815.0$ | $t_1=7.45$<br>$d_2=0$ | 1.506 | 57 |
| II | $R_3=+33.16$<br>$R_4=-125.5$ | $t_3=13.57$ | 1.506 | 57 |
| III | $R_4=-125.5$<br>$R_5=+39.76$ | $t_4=1.69$<br>$d_5=3.75$ | 1.591 | 31 |
| IV | $R_6=-183.4$<br>$R_7=+28.41$ | $t_6=1.69$<br>$d_7=6.50$ | 1.591 | 31 |
| V | $R_8=+74.52$<br>$R_9=-67.57$ | $t_8=6.40$<br>$d_9=59.61$ | 1.591 | 31 |

Example II
f=100    f/3

| Lens | Radius | Thickness | $N_D$ | V |
|---|---|---|---|---|
| I | $R_1=+59.62$<br>$R_2=+477.0$ | $t_1=6.70$<br>$d_2=0$ | 1.506 | 57 |
| II | $R_3=+28.74$<br>$R_4=-119.2$ | $t_3=15.5$ | 1.506 | 57 |
| III | $R_4=-119.2$<br>$R_5=+36.11$ | $t_4=1.60$<br>$d_5=4.00$ | 1.591 | 31 |
| IV | $R_6=-265.0$<br>$R_7=+27.11$ | $t_6=1.60$<br>$d_7=4.80$ | 1.591 | 31 |
| V | $R_8=+50.73$<br>$R_9=-73.94$ | $t_8=4.80$<br>$d_9=61.9$ | 1.591 | 31 |

Example III
f=100    f/3

| Lens | Radius | Thickness | $N_D$ | V |
|---|---|---|---|---|
| I | $R_1=+82.45$<br>$R_2=+308.5$ | $t_1=6.69$<br>$d_2=0$ | 1.506 | 57 |
| II | $R_3=+26.71$<br>$R_4=-119.5$ | $t_3=13.5$ | 1.506 | 57 |
| III | $R_4=-119.5$<br>$R_5=+36.50$ | $t_4=1.53$<br>$d_5=3.85$ | 1.591 | 31 |
| IV | $R_6=-156.8$<br>$R_7=+28.21$ | $t_6=1.63$<br>$d_7=5.93$ | 1.591 | 31 |
| V | $R_8=+63.76$<br>$R_9=-64.61$ | $t_8=6.89$<br>$d_9=64.2$ | 1.591 | 31 |

The above lens systems comprise an F/3 photographic objective having a 46° field and an over-all length which is substantially equal to the focal length of the system.

In the above embodiments of the invention camera lenses are provided which may have all of their components formed from organic resins and in which the "Petzval sum" is substantially satisfied without excessive curvature of the lens elements. Each of the novel photographic objectives preferably comprises a partially achromatized positive lens, a strong negative flint lens, and a positive lens of low nu value. The partially achromatized positive lens preferably consists of three components and each of the other lenses preferably consists of a single component. However, it is to be understood that any one of the components of the system can be replaced by a combination of lenses having the same power and dispersive properties as the single component. The resulting lens system has a flat, anastigmatic field, an aperture as low as F/3, and an over-all length which is not appreciably greater than the focal length of the system.

Since certain changes in the constructions set forth which embody the invention may be made without departing from its scope, it is intended that all matter contained in the above description, or shown in the accompanying drawing, shall be interpreted as illustrative and not in a limiting sense.

What is claimed is:

1. A photographic objective system comprising, in succession, a partially achromatized positive lens having a power of from .5 to 1.5 times that of the system, and consisting of a plurality of lens elements of crown and flint materials substantially in contact with each other, a negative lens of flint material having a power of from 2 to 3 times that of the system, and a positive lens of flint material having a power of from 1.4 to 2.1 times that of the system, all of the elements of crown material having a substantially similar index of refraction and nu value and all of the elements of flint material having a substantially similar index of refraction and nu value with the flint material having a higher index of refraction and a lower nu value than the crown material.

2. A photographic objective system comprising, in succession, a partially achromatized positive lens having a power of from .5 to 1.5 times that of the system, and consisting of a foremost positive lens of crown material followed by another positive lens of crown material in contact with said foremost lens and followed by a negative lens of flint material in contact with said second-named positive lens, and a negative lens of flint material having a power of from 2 to 3 times that of the system, and a positive lens of flint material having a power of from 1.4 to 2.1 times that of the system, said flint and crown materials having a difference in indices of refraction greater than .08 and a difference in nu values greater than 20, with the flint material having the higher index of refraction.

3. A photographic objective system comprising, in succession, a partially achromatized positive lens having a power of from .5 to 1.5 times that of the system, and consisting of a foremost positive lens of crown material followed by a doublet in contact with said positive lens and comprising a foremost positive lens of crown material and a negative lens of flint material, and a negative lens of flint material following said doublet and having a power of from 2 to 3 times that of the system, and a positive lens of flint material following said second-named negative lens and having a power of from 1.4 to 2.1 times that of the system, said flint material having an index of refraction of approximately 1.591 and a dispersive index of approximately 31, and said crown material having an index of refraction of approximately 1.506 and a dispersive index of approximately 57.

4. A photographic objective system comprising, in succession, a positive crown lens having a power from .66 to 1.33 times that of the system, a positive crown lens in contact with said first lens and having a power from 1.5 to 2.5 times that of the system, a negative flint lens secured to said second positive lens to form a doublet therewith and having a power of from 1.5 to 2.5 times that of the system, said lenses having a total power of from .5 to 1.5 times that of the system, a negative flint lens having a power of from 2 to 3 times the power of the system, and a positive flint lens having a power of from 1.4 to 2.1 times that of the system, said flint and crown materials having a difference in indices of refraction greater than .08 and a difference in nu values greater than 20, with the flint material having the higher index of refraction.

5. A camera lens system comprising, in succession, a positive crown lens having a power from .66 to 1.33 times that of the system, a positive crown lens in contact with said first lens and having a power from 1.5 to 2.5 times that of the system, a negative flint lens secured to said second positive lens to form a doublet therewith and having a power of from 1.5 to 2.5 times that of the system, said lenses having a total power of from .5 to 1.5 times that of the system, a negative flint lens having a power of from 2 to 3 times the power of the system, and a positive flint lens having a power of from 1.4 to 2.1 times that of the system, said flint material having an index of refraction of approximately 1.591 and a dispersive index of approximately 31, and said crown material having an index of refraction of approximately 1.506 and a dispersive index of approximately 57.

6. A camera lens system comprising, in the order named, a positive crown element having a power from .66 to 1.33 times that of the system and a rear radius of curvature greater than 2.5 times the focal length of the system, a positive crown element in contact with said first element and having a power from 1.5 to 2.5 times that of the system, a negative flint element secured to said second positive element to form a doublet therewith and having a power from 1.5 to 2.5 times that of the system, the radius of curvature of the adjoining surfaces of said two last-named elements being from .9 to 1.6 times the focal length of the system, the lens consisting of said elements having a total power of from 1.5 to 2.5 times that of the system, a negative flint lens of from 2 to 3 times the power of the system and having a radius of curvature of the forward surface thereof of from ∞ to a concave curvature of a radius equal to the focal length of the system and a bi-convex positive flint lens having a power of from 1.4 to 2.1 times that of the system, and a radius of curvature of either surface not greater than 2 times the radius of curvature of the other surface thereof.

7. A camera lens of the character described comprising five axial components and having substantially the numerical data set forth in the following table wherein I, II, III, IV, and V designate the successive lens elements, $R_1$ to $R_9$ designate the radii of the surfaces thereof, $t_1$, $t_3$, $t_4$, $t_6$, and $t_8$ designate the thicknesses thereof, $d_2$, $d_5$, $d_7$ designate the air spaces between components I and II, components III and IV, and components IV and V, respectively, the column $N_D$ designates the indices of refraction of the components and the column V designates the Abbé dispersive indices of the components:

| Lens | Radius | Thickness | $N_D$ | V |
|---|---|---|---|---|
| I | $R_1=+43.36$<br>$R_2=+815.0$ | $t_1=7.45$<br>$d_2=0$ | 1.506 | 57 |
| II | $R_3=+33.16$<br>$R_4=-125.5$ | $t_3=13.57$ | 1.506 | 57 |
| III | $R_4=-125.5$<br>$R_5=+39.76$ | $t_4=1.69$<br>$d_5=3.75$ | 1.591 | 31 |
| IV | $R_6=-183.4$<br>$R_7=+28.41$ | $t_6=1.69$<br>$d_7=6.50$ | 1.591 | 31 |
| V | $R_8=+74.52$<br>$R_9=-67.57$ | $t_8=6.40$ | 1.591 | 31 |

8. A camera lens of the character described comprising five axial components and having substantially the numerical data set forth in the following table wherein I, II, III, IV, and V designate the successive lens elements, $R_1$ to $R_9$ disignate the radii of the surfaces thereof, $t_1$, $t_3$, $t_4$, $t_6$, and $t_8$ designate the thicknesses thereof, $d_2$, $d_5$, $d_7$ designate the air spaces between components I and II, components III and IV, and components IV and V, respectively. The column $N_D$ designates the indices of refraction of the components and the column V designates the nu values of the components:

| Lens | Radius | Thickness | $N_D$ | V |
|---|---|---|---|---|
| I | $R_1=+59.62$<br>$R_2=+477.0$ | $t_1=6.70$<br>$d_2=0$ | 1.506 | 57 |
| II | $R_3=+28.74$<br>$R_4=-119.2$ | $t_3=15.5$ | 1.506 | 57 |
| III | $R_4=-119.2$<br>$R_5=+36.11$ | $t_4=1.60$<br>$d_5=4.00$ | 1.591 | 31 |
| IV | $R_6=-265.0$<br>$R_7=+27.11$ | $t_6=1.60$<br>$d_7=4.80$ | 1.591 | 31 |
| V | $R_8=+50.73$<br>$R_9=-73.94$ | $t_8=4.80$<br>$d_9=61.9$ | 1.591 | 31 |

9. A camera lens of the character described comprising five axial components and having substantially the numerical data set forth in the following table wherein I, II, III, IV, and V designate the successive lens elements, $R_1$ to $R_9$ designate the radii of the surfaces thereof, $t_1$, $t_3$, $t_4$, $t_6$, and $t_8$ designate the thicknesses thereof, $d_2$, $d_5$, $d_7$ designate the air spaces between components I and II, components III and IV, and components IV and V, respectively, the column $N_D$ designates the indices of refraction of the components and the column V designates the nu values of the components:

| Lens | Radius | Thickness | $N_D$ | V |
|---|---|---|---|---|
| I | $R_1=+82.45$<br>$R_2=+308.5$ | $t_1=6.69$<br>$d_2=0$ | 1.506 | 57 |
| II | $R_3=+26.71$<br>$R_4=-119.5$ | $t_3=13.5$ | 1.506 | 57 |
| III | $R_4=-119.5$<br>$R_5=+36.50$ | $t_4=1.53$<br>$d_5=3.85$ | 1.591 | 31 |
| IV | $R_6=-156.8$<br>$R_7=+28.21$ | $t_6=1.63$<br>$d_7=5.93$ | 1.591 | 31 |
| V | $R_8=+63.76$<br>$R_9=-64.61$ | $t_8=6.89$<br>$d_9=64.2$ | 1.591 | 31 |

DAVID S. GREY.

REFERENCES CITED

The following references are of record in the file of this patent:

UNITED STATES PATENTS

| Number | Name | Date |
|---|---|---|
| 2,057,674 | Fields | Oct. 20, 1936 |
| 2,193,742 | Rohm et al. | Mar. 12, 1940 |
| 2,254,440 | Moulton | Sept. 2, 1941 |
| 1,980,483 | Hill | Nov. 13, 1934 |
| 2,170,428 | Richter | Aug. 22, 1939 |

FOREIGN PATENTS

| Number | Country | Date |
|---|---|---|
| 538,653 | British | Aug. 12, 1941 |
| 237,861 | British | Feb. 11, 1926 |
| 490,381 | British | Aug. 15, 1938 |